(12) United States Patent
Chanal

(10) Patent No.: US 7,474,066 B2
(45) Date of Patent: Jan. 6, 2009

(54) METHOD AND SYSTEM FOR SUPPLYING ELECTRICAL POWER TO A SUPPLY BUS FOR AN ELECTRIC VEHICLE, RECORDING MEDIUM, AND VEHICLE FOR THIS METHOD

(75) Inventor: Pierre Chanal, Vielle Adour (FR)

(73) Assignee: Alstom Transport, SA, Levallois-Perret (FR)

( * ) Notice: Subject to any disclaimer, the term of this patent is extended or adjusted under 35 U.S.C. 154(b) by 117 days.

(21) Appl. No.: 11/602,848

(22) Filed: Nov. 21, 2006

(65) Prior Publication Data

US 2007/0126377 A1    Jun. 7, 2007

(30) Foreign Application Priority Data

Oct. 7, 2005    (FR)  ................................. 05 10282

(51) Int. Cl.
*H02P 1/00*    (2006.01)
(52) U.S. Cl.  .................. 318/139; 318/798; 318/812
(58) Field of Classification Search .................. 318/812, 318/139, 813, 727, 805, 798
See application file for complete search history.

(56) References Cited

U.S. PATENT DOCUMENTS

| 5,814,957 | A * | 9/1998 | Yoshida ................. 318/400.11 |
| 6,323,600 | B1 * | 11/2001 | Statnic et al. ........... 315/209 R |
| 6,404,151 | B1 * | 6/2002 | Bader ......................... 318/39 |
| 6,566,764 | B2 * | 5/2003 | Rebsdorf et al. .............. 290/44 |
| 2002/0171405 | A1 * | 11/2002 | Watanabe ................... 323/282 |

FOREIGN PATENT DOCUMENTS

| DE | 197 02 1232 | 7/1998 |
| EP | 1 288 060 | 5/2003 |
| EP | 1 315 180 | 5/2003 |

* cited by examiner

*Primary Examiner*—Rina I Duda
(74) *Attorney, Agent, or Firm*—Davidson, Davidson & Kappel, LLC

(57) ABSTRACT

A method for supplying electrical power to a DC supply bus of a rotating electric motor of an electric vehicle is provided. The method includes the steps of selectively supplying electrical power to the bus via a first power supply at a first alternating voltage and selectively supplying electrical power to the bus via a second power supply at a second alternating voltage that is less than the first alternating voltage.

11 Claims, 3 Drawing Sheets

US 7,474,066 B2

METHOD AND SYSTEM FOR SUPPLYING ELECTRICAL POWER TO A SUPPLY BUS FOR AN ELECTRIC VEHICLE, RECORDING MEDIUM, AND VEHICLE FOR THIS METHOD

TECHNICAL FIELD

The invention relates to a method and a system for supplying electrical power to a supply bus of an electric vehicle, a recording medium, and a vehicle for this method.

The term DC supply bus is intended to refer to a bus which can be connected, successively by means of a controllable voltage rectifier/booster and a main transformer, to a first catenary which supplies a first alternating voltage. The main transformer is equipped at the secondary winding with a first connection terminal which corresponds to a first winding ratio of the transformer.

The winding ratio is defined in this instance as being the ratio of the number of turns used at the secondary winding over the number of turns used at the primary winding of the main transformer in order to carry out the transformation of alternating voltages.

In order to supply the bus with electrical power from the first catenary, known methods comprise:
  a step for controlling the closure of a precharge switch in order to connect the bus to the first terminal by way of a means for limiting current surge caused by at least one rechargeable temporary energy storage unit for the bus, then
  when the direct voltage of the bus exceeds 70% of its nominal value, a step for controlling the closure of a first isolating switch in order to connect the bus to the first terminal without passing via the current surge limitation means.

In this instance "closing" is intended to refer to the action of placing the switch in the on state and "opening" the action of placing the switch in the off state.

BACKGROUND TO THE INVENTION

Nowadays, operators of these electric vehicles require the same bus to be able to be supplied with electrical power from the first catenary and, alternately, from a second catenary which supplies a second voltage which is lower than the first voltage. To this end, the main transformer is equipped at the secondary winding with a second connection terminal which corresponds to a second winding ratio of the main transformer greater than the first winding ratio.

In this context, the invention proposes a method which is capable of supplying the DC supply bus of the electric vehicle with electrical power from the first catenary and, alternately, from the second catenary.

SUMMARY OF THE INVENTION

The invention therefore relates to an electrical power supply method which comprises, when the bus is supplied with electrical power from the second catenary:
  a step for controlling the closure of the precharge switch in order to connect the bus to the first terminal via the same current limitation means, then
  when the direct voltage of the bus has reached at least 70% of a maximum intermediate voltage defined by the following relationship:

$$V_{mi} = \frac{V_2}{V_1} \times V_n$$

where:
  $V_{mi}$ is the maximum intermediate voltage,
  $V_1$ is the first voltage,
  $V_2$ is the second voltage, and
  $V_n$ is the nominal voltage,
  a step for controlling the rectifier/booster in order to rectify and increase the alternating voltage supplied by the first terminal and supply the bus with the voltage which has been rectified and increased in this manner, then
    when the direct voltage on the bus reaches at least 70% of the nominal voltage, a step for controlling the disconnection of the bus from the first terminal and a step for controlling the closure of a second isolating switch in order to connect the bus to the second terminal without passing via the precharge circuit.

The above method allows the bus to be supplied with electrical power from the second catenary by limiting the current surge. Furthermore, owing to the above method, the current surge limitation is brought about using the same current surge limitation means as that used to limit the current surge when electrical power is supplied from the first catenary. This method therefore requires very few physical modifications to existing electrical circuits in order to be implemented and in particular does not require the addition of a second current surge limitation means whose use would be limited to electrical power supplies from the second catenary.

The embodiments of this method may comprise one or more of the following features:
  when the precharge switch is closed, the rectifier/booster is not controlled and functions as a diode bridge;
  the rectifier/booster is systematically controlled in order to function as a rectifier and a booster when the first or second isolating switch is closed.

The invention also relates to a data recording medium which comprises instructions for carrying out the electrical power supply method above, when these instructions are carried out by an electronic processor.

The invention also relates to a system for supplying electrical power to a DC supply bus of a rotating electric motor of an electric vehicle so that the direct voltage of the bus reaches a nominal value, this system comprising:
  a main transformer whose primary winding can be connected to a first catenary which supplies a first alternating voltage ($V_1$) and, alternately, to a second catenary which supplies a second lower alternating voltage ($V_2$), the main transformer being equipped at the secondary winding with a first and a second connection terminal corresponding to a first and a second winding ratio of the transformer, respectively, the second ratio of the transformer being greater than the first winding ratio,
  a controllable electrical power supply circuit which is connected to the first and second terminals of the main transformer, this circuit comprising:
  a means for limiting current surge caused by at least one rechargeable temporary energy storage unit of the bus,
  a precharge switch which is capable of connecting the bus to the first terminal by way of the current surge limitation means, a first isolating switch which is capable of connecting the bus to the first terminal without passing via the current surge limitation means, and a second isolating switch which is capable of connecting the bus to the second terminal without passing via the current surge limitation means, a controllable voltage rectifier/booster which is connected to the supply bus in order to supply it with rectified voltage produced from an alternating voltage which is supplied through the electrical power supply circuit via the first or second terminal, and a unit for controlling the electrical power supply circuit and the rectifier/booster, in which the control unit is programmed to carry out the electrical power supply method above.

The embodiments of this electrical power supply system may comprise one or more of the following features:

the electrical power supply circuit comprises a single current surge limitation means which is common to the electrical power supply from the first catenary and, alternately, from the second catenary;

the current surge limitation means is a resistor.

The embodiments of this power supply system further have the following advantage:

the use of a single current limitation means and/or the fact that this current limitation means is a single resistor simplifies the system and therefore decreases the production costs thereof.

Finally, the invention also relates to an electric vehicle comprising the electrical power supply system described above.

BRIEF DESCRIPTION OF THE DRAWINGS

The invention will be better understood from a reading of the following description, given purely by way of example and with reference to the drawings, in which.

DESCRIPTION OF PREFERRED EMBODIMENTS

Figure 1:
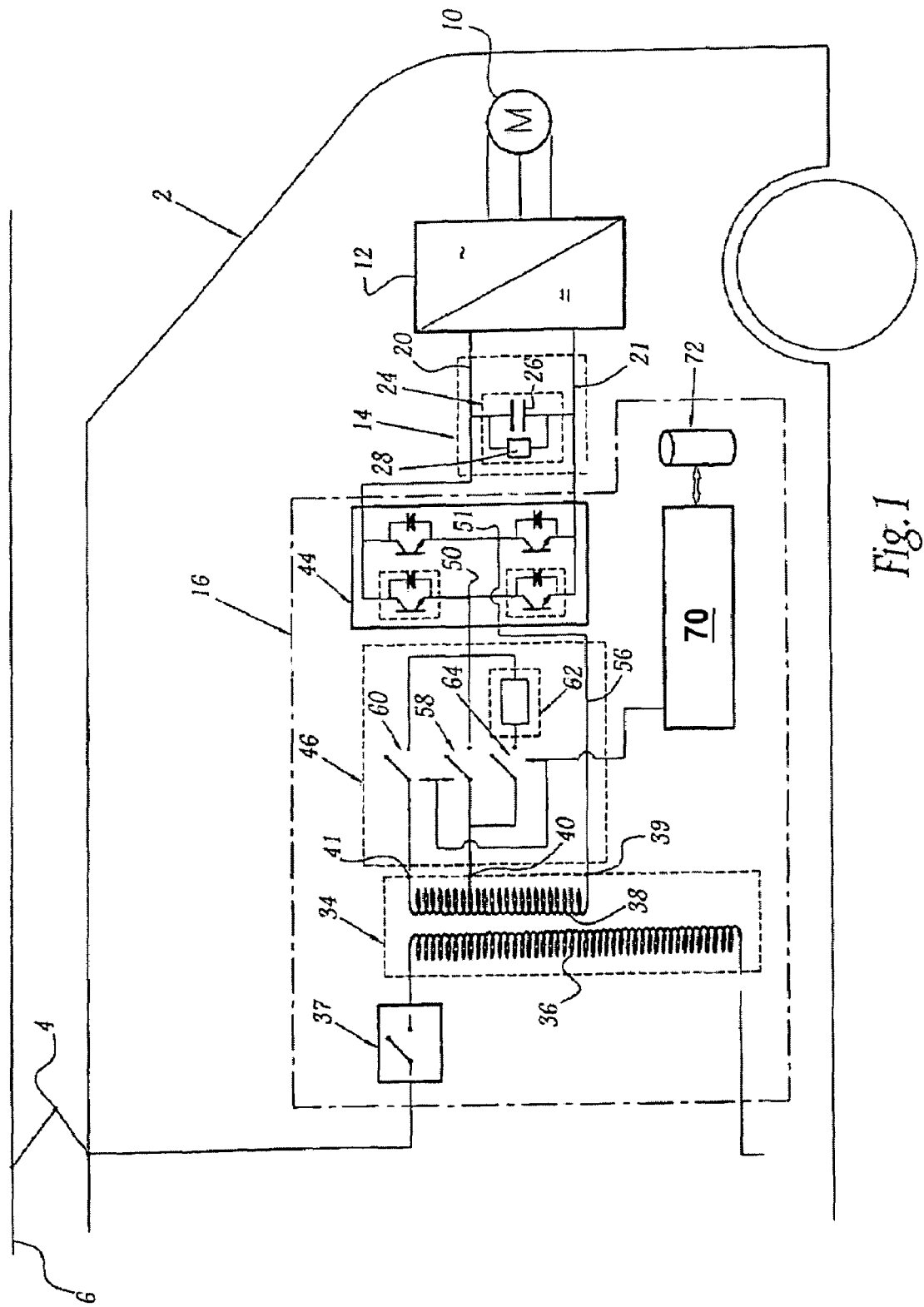
FIG. 1 is a schematic illustration of an electric vehicle equipped with an electrical power supply system for a DC supply bus.

FIG. 1 illustrates an electric vehicle 2 which is supplied with alternating voltage by means of a pantograph 4 which slides along a catenary 6.

Catenary in this instance is intended to refer both to a supply wire which is suspended in the air and along which a pantograph slides, and a supply rail which is placed on the ground and along which a runner slides. In the railway industry, this rail which is placed on the ground is referred to as a "third rail".

In this instance, the vehicle 2 is, for example, a locomotive.

The vehicle 2 is equipped with an asynchronous electric motor which is suitable for rotatably driving the driving wheels of the vehicle 2. Typically, the vehicle 2 comprises as many asynchronous electric motors as axles for the vehicle 2.

Each electric motor is supplied successively via a voltage converter, a DC supply voltage bus and an electrical power supply system for the bus. The DC supply voltage bus is known as a "DC bus".

In this instance, in order to simplify the illustration, only an asynchronous electric motor 10 and the converter 12, the bus 14 and the electrical power supply system 16 thereof are illustrated in order to simplify FIG. 1.

The converter 12 is suitable for converting the direct voltage $V_{bus}$ present on the bus 14 into a three-phase alternating voltage used to supply the stator windings of the motor 10. The control circuit of the converter 12 is not illustrated.

The bus 14 is formed by two electrical conductors 20 and 21 which are connected, on the one hand, to respective inputs of the converter 12 and, on the other hand, to the system 16.

This bus 14 comprises rechargeable temporary energy storage units in order to temporarily maintain the voltage $V_{bus}$ on this bus even in the event of an interruption to the power supply. In this instance, only one of these units 24 has been illustrated.

This unit 24 is formed by a capacitor 26 which is connected between the conductors 20 and 21 and a discharge resistor 28 which is connected in parallel with the terminals of this capacitor 26.

After being supplied with electrical power, the bus 14 has, in the steady state, a nominal voltage $V_n$ which is equal, for example, to 1800 Vdc.

The system 16 allows the bus 14 to be supplied with electrical power and this bus 14 to be supplied both from a catenary having an alternating voltage of 15 kV and a catenary having an alternating voltage of 25 kV. Catenaries having a voltage of 25 kV are found, for example, in countries such as France and Italy, whilst catenaries having a voltage of 15 kV are found, for example, in countries such as Germany. The system 16 thus allows the vehicle 2 to operate both on German and French rail networks.

The system 16 comprises a main voltage transformer 34 which is equipped with a primary winding 36 which is connected to the pantograph 4 by means of a circuit breaker 37. The number of turns of the winding 36 is designated $n_1$.

The transformer 34 also comprises a secondary winding 38 which is equipped with three connection terminals 39, 40 and 41. The numbers of turns of the winding 38 between the terminals 39 and 40 and the terminals 39 and 41, respectively, are designated $n_{25}$ and $n_{15}$.

Inside the system 16, a controllable rectifier/booster 44 is connected at the input, by means of a controllable electrical power supply circuit 46, to the terminals 39 to 41.

The rectifier/booster 44 is equipped with two output terminals which are connected to the conductors 20 and 21 of the bus 14, respectively.

This rectifier/booster 44 is capable of functioning as a diode bridge when it is not controlled and as a voltage rectifier/booster when it is controlled.

Schematically, the rectifier/booster 44 comprises two parallel arms which are each formed by two switches which are connected in series by means of respective central points 50 and 51. The ends of each of these arms are connected to the conductors 20 and 21 of the bus 14.

In order to be able to function as a diode bridge when this rectifier/booster is not controlled, each switch is, for example, formed by a PNP transistor, to the terminals of which a free wheel diode is connected in parallel. Since rectifiers/boosters of this type are conventional, this will not be described in greater detail.

The electrical power supply circuit 46 connects the central point 51 to the terminal 39 of the winding 38. The circuit 46 is also capable of connecting the central point 50 to the terminal 40 and, alternately, to the terminal 41. To this end, the circuit 46 comprises:

- a conductor 56 which connects the terminal 39 directly to the central point 51,
- a controllable isolating switch 58 which is capable of connecting the terminal 40 to the central point 50 when it is closed, and isolating the terminal 40 from the central point 50 when it is open, and
- a controllable isolating switch 60 which is capable of connecting the terminal 41 to the central point 50 when it is closed, and isolating the terminal 41 from the central point 50 when it is open.

The circuit 46 also comprises a means 62 for limiting the current surge caused by the unit 24. This limitation means 62 is connected in parallel with the terminals of the switch 58. For example, in this instance, the limitation means 62 is formed only by a resistor whose value is between 25 and 150 Ω.

A controllable precharge switch 64 is also connected in series to the limitation means 62 and in parallel with the terminals of the switch 58.

Finally, the system 16 comprises a control unit 70 which is capable of controlling the closure and opening of the switches 58, 60 and 64 and the rectifier/booster 44. More precisely, the control unit 70 is capable of carrying out the electrical power supply method of FIG. 2.

This control unit 70 is, for example, produced from a conventional programmable electronic processor which is capable of carrying out instructions which are recorded on a data recording medium 72. To this end, the medium 72 comprises instructions for carrying out the method of FIG. 2 when these instructions are carried out by the unit 70.

The operation of the system 16 will now be described with reference to the method of FIG. 2.

Figure 2:
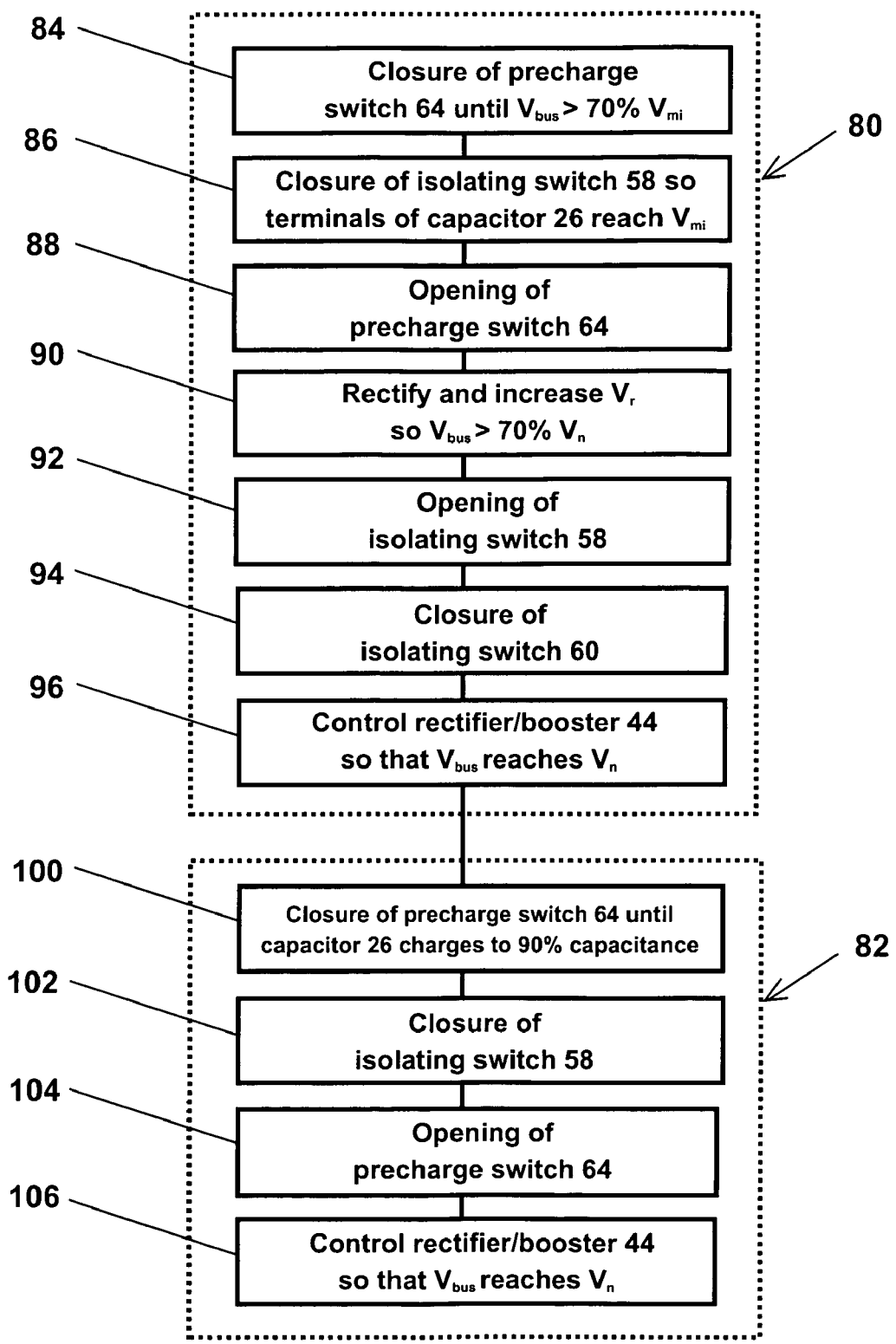
FIG. 2 is a flow chart of an electrical power supply method used in the system of FIG. 1.

The method of FIG. 2 substantially comprises two phases 80 and 82.

During phase 80, the bus 14 is supplied with electrical power from a catenary which has an alternating voltage of 15 kV.

Figure 3:
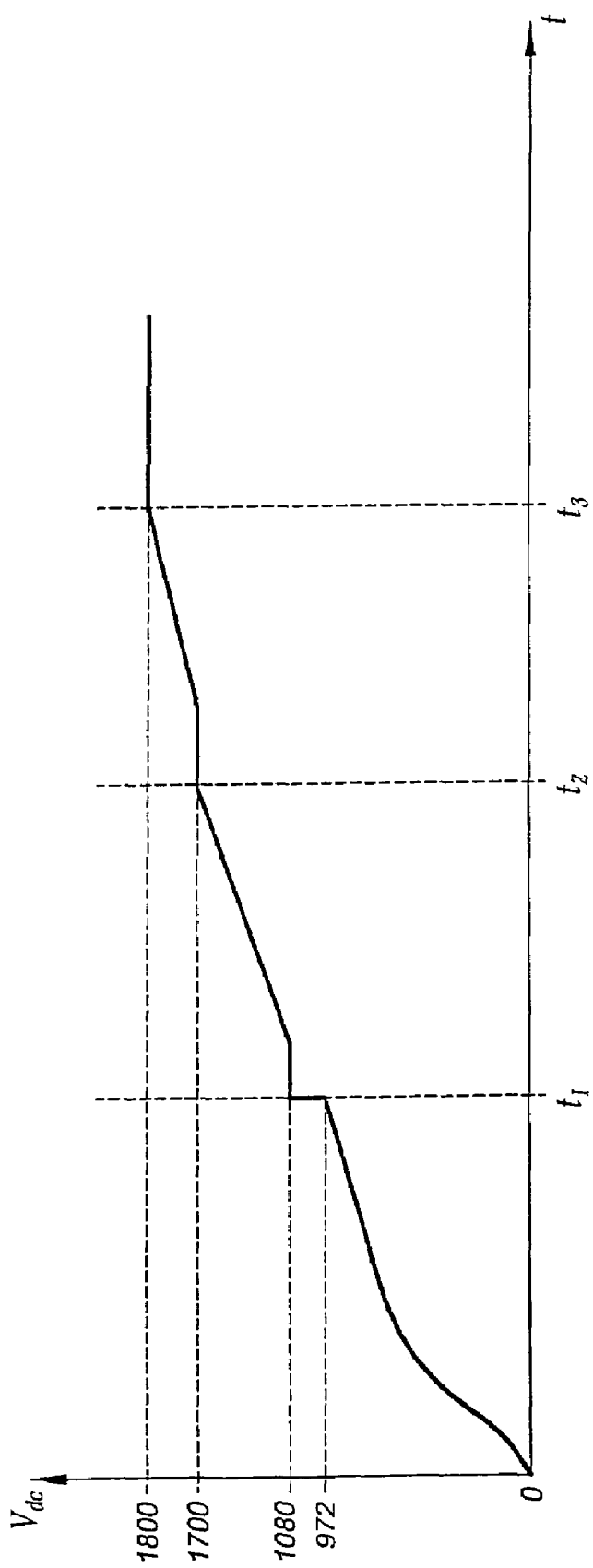
FIG. 3 is a graph which illustrates the development of the direct voltage of the DC supply bus of the vehicle of FIG. 1 as a function of time when the method of FIG. 2 is carried out.

Initially, as indicated in the graph of FIG. 3, the voltage $V_{bus}$ of the bus 14 is zero and the switches 58, 60 and 64 are open. The transformer 34 is supplied with alternating voltage of 15 kV by means of the circuit breaker 37 and the pantograph 4.

To begin with, the unit 70 controls the closure of the switch 64 during a step 84. The rectifier/booster 44 is not controlled so that it functions as a diode bridge. Under these circumstances, the transformer 34 transforms the voltage of 15 kV into an alternating voltage $V_r$ in the order of 570 Vac. This voltage $V_r$ is rectified by the rectifier/booster 44 and supplies the bus 14. The capacitor 26 is charged progressively with a time constant in accordance with the resistance value of the limitation means 62. It should thus be understood that the limitation means 62 slows the charge of the capacitor 26 and therefore limits the current surge caused by the presence of the energy storage unit 24. The step 84 lasts, for example, for a period of time equal to 3RC, where R is the resistance value of the limitation means 62 and C is the capacitance of the capacitor 26 in order to obtain a voltage $V_{bus}$ on the bus greater than 70% of a maximum intermediate voltage $V_{mi}$ defined by the following relationship:

$$V_{mi} = \frac{V_2}{V_1} \times V_n$$

where:
- $V_1$ is the voltage of 25 kV,
- $V_2$ is the voltage of 15 kV, and
- $V_n$ is the nominal voltage equal in this instance to 1800 Vdc.

This voltage $V_{mi}$ corresponds to the maximum direct voltage which can be achieved on the bus 14 by supplying this bus from an alternating voltage taken between the terminals 39 and 40 of the winding 38.

More precisely, in this instance, since the period of time is selected to be equal to 3RC, the voltage $V_{bus}$ at the end of step 84 is equal to 90% of the voltage $V_{mi}$, that is to say, in this instance, approximately equal to 972 Vdc.

On the graph of FIG. 3, the end of step 84 corresponds to the time $t_1$.

At time $t_1$, during a step 86, the unit 70 controls the closure of the switch 58 then, during a step 88, the opening of the switch 64. When the switch 58 is closed, this short-circuits the limitation means 62 so that the voltage at the terminals of the capacitor 26 rapidly reaches the voltage $V_{mi}$.

Then, during a step 90, the unit 70 controls the rectifier/booster 44 in order to rectify and increase the voltage $V_r$ so as to reach a voltage on the bus 14 greater than at least 70% of the nominal voltage $V_n$. For example, in this instance, the rectifier/booster 44 is controlled in order to reach a voltage of 1700 Vdc on the bus 14. The step 90 lasts until the voltage of 1700 Vdc is reached which occurs at a time $t_2$ in FIG. 3.

When the voltage of 1700 Vdc is reached on the bus 14, the unit 70 controls the opening of the switch 58 during a step 92 and the closure of the switch 60 during a step 94. From this time, the voltage $V_r$ at the input of the rectifier/booster 44 corresponds to the voltage present between the terminals 39 and 41 of the winding 38. Since the winding ratio of the transformer is greater under these conditions, the voltage $V_r$ is therefore greater than that previously used. For example, in this instance, the voltage $V_r$ is equal to 950 Vac.

As soon as the switch 60 is closed, the unit 70 controls the rectifier/booster 44 during a step 96 so that the voltage $V_{bus}$ reaches the value of 1800 Vdc, that is to say, the nominal value at the time $t_3$.

From the time $t_3$, the steady state of the system 16 is reached.

When the vehicle changes rail network and travels on a railway whose catenary has a voltage of 25 kV, it is then necessary to carry out the phase 82 for supplying electrical power from a catenary under 25 kV.

Before beginning electrical power supply, the initial state is the same as the one preceding phase 80.

At the beginning of phase 82, the unit 70 controls the closure of the switch 64 during a step 100. The rectifier/booster 44 is not controlled and functions as a diode bridge. Under these conditions, the voltage $V_r$ is equal to 950 Vac since the voltage at the terminals of the primary winding 36 is equal to 25 kV. The step 100 lasts, for example, for a period of time selected to be equal to 3RC so that, at the end of step 100, the capacitor 26 is charged to 90% of its capacitance and the voltage $V_{bus}$ is equal to 1620 Vdc.

During a step 102, the unit 70 subsequently controls the closure of the switch 58 then, during a step 104, the unit 70 controls the opening of the switch 64.

As soon as the switch 58 is closed, the unit 70 controls the rectifier/booster 44 during a step 106 in order to reach the nominal voltage $V_n$ on the bus 14.

Step 100 allows the current surge caused by the unit 24 to be limited.

A number of other embodiments of the system 16 and the method of FIG. 2 are possible. For example, it is possible to simultaneously keep the switch 64 and the switch 58 or the switch 64 and switch 60 closed. The method of FIG. 2 has been described for the specific case of an electrical power supply circuit which comprises a single common current surge limitation means and an electrical power supply from a catenary at 15 kV and from a catenary at 25 kV. In a variant, however, a second current surge limitation means is connected by means of a second precharge switch in parallel with the switch 60 and the second precharge switch is controlled when electrical power is supplied from a catenary at 15 kV in order to limit the current surge. In an embodiment of this type, the method of FIG. 2 can be used if the second precharge switch or the second current surge limitation means malfunctions.

Finally, the transformer 34 has been described for the specific case in which the terminal 40 is an intermediate point of the winding 38. The winding 38 in a variant is replaced by a first and a second secondary winding which are connected in parallel between the input terminals of the rectifier/booster 44. The first and second secondary windings have winding ratios which are equal to those observed between the terminals 39 and 40 and between the terminals 39 and 41, respectively.

The invention claimed is:

1. A method for supplying electrical power to a DC supply bus of a rotating electric motor of an electric vehicle comprising the steps of:
   selectively supplying electrical power to the bus via a first power supply at a first alternating voltage by:
      coupling the first power supply to a primary winding of a transformer;
      coupling a first terminal of a secondary winding of the transformer to the bus via a rectifier booster circuit and a current surge limitation circuit, the first terminal having a first winding ratio; and
      coupling the first terminal to the bus via the rectifier booster circuit but not the current surge limitation circuit after a direct voltage in the bus exceeds a first predetermined value; and
   selectively supplying electrical power to the bus via a second power supply at a second alternating voltage that is less than the first alternating voltage by:
      coupling the second power supply to the primary winding of the transformer;
      coupling the first terminal to the bus via the rectifier booster circuit and the current surge limitation circuit;
      coupling, when the direct voltage in the bus exceeds a second predetermined value, the first terminal to the bus via the rectifier booster circuit but not the current surge limitation circuit, and rectifying and increasing the second alternating voltage provided by the first terminal; and
      coupling, when the direct voltage in the bus exceeds a third predetermined value, a second terminal of the secondary winding of the transformer to the bus via the rectifier booster circuit, the second terminal having a second winding ratio greater than the first winding ratio.

2. The method as recited in claim 1 wherein the first predetermined value equals 70% of a nominal voltage of the bus.

3. The method as recited in claim 1 wherein the second predetermined value equals 70% of a defined maximum intermediate voltage, the defined maximum intermediate voltage equaling the second alternating voltage multiplied by a nominal voltage of the bus divided by the first alternating voltage.

4. The method as recited in claim 1 wherein the third predetermined value equals 70% of a nominal voltage of the bus.

5. The method as recited in claim 1 wherein the rectifier booster circuit functions as a diode bridge when the first terminal of a secondary winding of the transformer is coupled to the bus via the current surge limitation circuit.

6. The method as recited in claim 1 wherein the rectifier booster circuit functions as a rectifier and a booster when the second terminal of the secondary winding of the transformer is coupled to the bus via the rectifier booster circuit and when the first terminal is coupled to the bus via the rectifier booster circuit but not the current surge limitation circuit.

7. A system for supplying electrical power to a DC supply bus of a rotating electric motor of an electric vehicle comprising:
   a transformer including a primary winding and a secondary winding, the primary winding capable of being selectively coupled to a first power source or a second power source, the first power source supplying a first alternating voltage and the second power source supplying a second alternating voltage less than the first alternating voltage, the secondary winding including a first connection terminal and a second connection terminal, the first connection terminal having a first winding ratio and the second connection terminal having a second winding ratio, the second winding ratio being greater than the first winding ratio;
   a voltage rectifier and booster circuit having an input terminal and an output terminal coupled to the bus;
   a current surge limitation circuit; and
   an electrical power supply circuit for selectively coupling either the first connection terminal or the second connection terminal to the input terminal of the voltage rectifier and booster circuit, and for selectively coupling the current surge limitation circuit between the first connection terminal and input terminal of the voltage rectifier and booster circuit.

8. The system recited in claim 7 wherein the electrical power supply circuit includes a precharge switch for selectively coupling the current surge limitation circuit between the first connection terminal and the voltage rectifier and booster circuit, a first isolating switch for selectively coupling the first connection terminal to the voltage rectifier and booster circuit and a second isolating switch for selectively coupling the second connection terminal to the voltage rectifier and booster circuit.

9. The system recited in claim 8 further comprising a control unit, the control unit controlling the electrical power supply circuit and the voltage rectifier and booster circuit such that when the primary winding of the transformer is connected to the first power supply:
   the precharge first switch couples the current surge limitation circuit between the first connection terminal and the voltage rectifier and booster circuit, and after a voltage in the bus exceeds a first predefined value, the first isolating switch couples the first connection terminal to the voltage rectifier and booster circuit; and
when the primary winding of the transformer is connected to the second power supply:
   the precharge first switch couples the current surge limitation circuit between the first connection terminal and the voltage rectifier and booster circuit, and after the voltage in the bus exceeds a second predefined value, the voltage rectifier and booster circuit rectifies and increases the second alternating voltage, and after the voltage in the bus exceeds a third predefined value, the second isolating switch couples the second connection terminal to the voltage rectifier and booster circuit.

10. The system recited in claim 7 wherein the current surge limitation circuit comprises a resistor.

11. An electrical vehicle comprising:
an electrical power supply system as recited in claim 7; and
a supply bus.

* * * * *